H. S. WEYMOUTH.
WATER LEVEL.
APPLICATION FILED SEPT. 14, 1910.
986,109.
Patented Mar. 7, 1911.
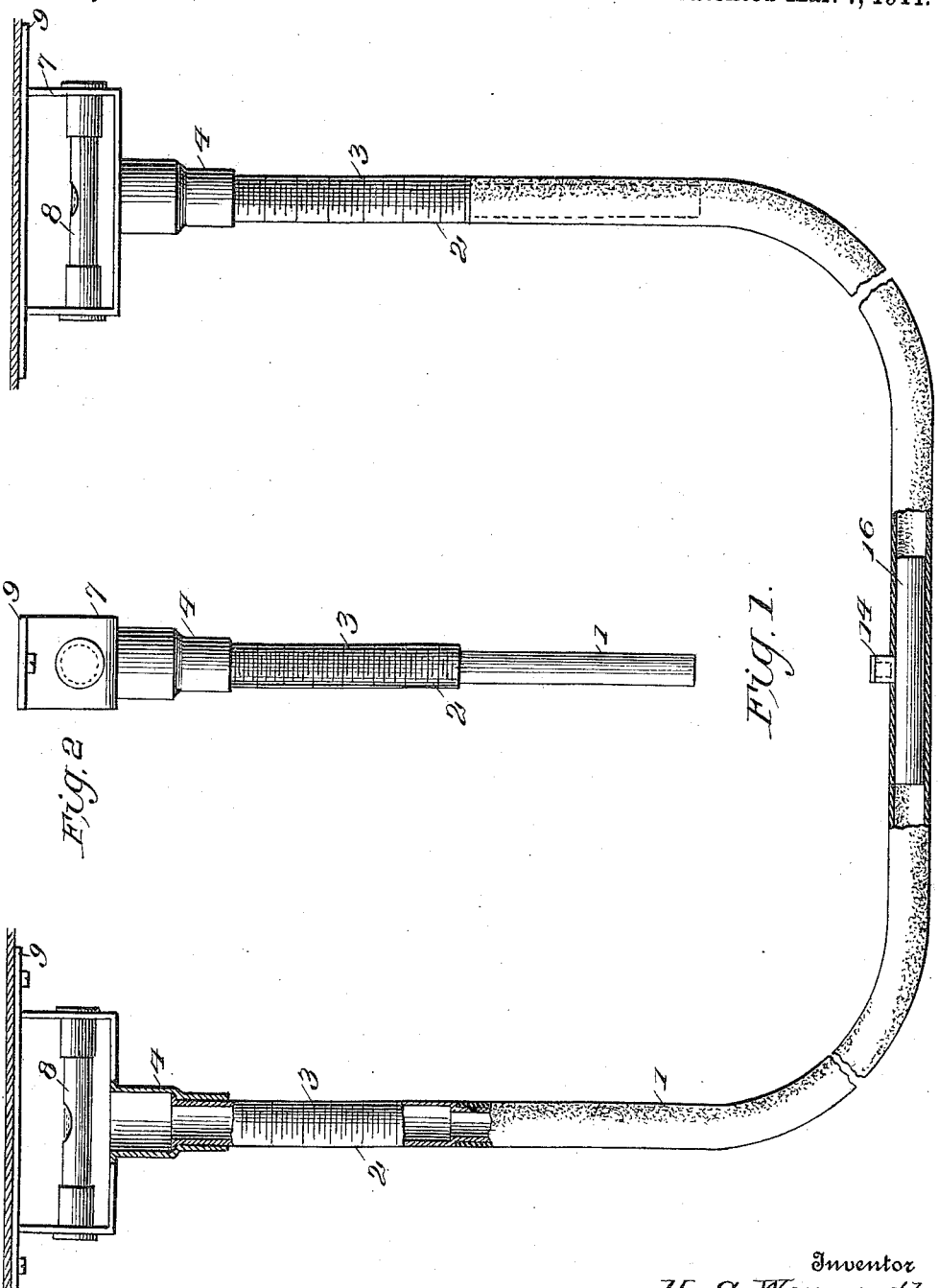
Witnesses
L. D. Lindsay
Chas. C. Richardson
Inventor
H. S. Weymouth
By Greeley & McIntire
Attorney

UNITED STATES PATENT OFFICE.

HERBERT S. WEYMOUTH, OF BROOKLYN, NEW YORK.

WATER-LEVEL.

986,109.  Specification of Letters Patent.  Patented Mar. 7, 1911.

Application filed September 14, 1910. Serial No. 582,102.

*To all whom it may concern:*

Be it known that I, HERBERT S. WEYMOUTH, a citizen of the United States, residing at Brooklyn, in the county of Kings and State of New York, have invented certain new and useful Improvements in Water-Levels; and I do hereby declare the following to be a full, clear, and exact description of the invention, such as will enable others skilled in the art to which it appertains to make and use the same.

The present invention relates to certain new and useful improvements in the construction of water levels, such as are commonly employed by plasterers, for taking levels of different parts of an ornamental or panel ceiling, and by all other trades connected with general building construction, and also for all work where long leveling is necessary.

With these ends in view, my invention has for its object to provide a water level of the character stated, which shall be comparatively simple and inexpensive, and which can be quickly taken apart and carried from place to place.

The invention further contemplates the provision of a water level embodying novel features of construction, whereby air is prevented from accumulating in the water tube in such a manner as to cause the level to give a false reading.

With these and other objects in view, the invention consists in certain combinations and arrangements of the parts, as will more fully appear as the description proceeds, the novel features thereof being pointed out in the appended claims.

For a full understanding of the invention, reference is to be had to the following description and accompanying drawing, in which:—

Figure 1 is a side elevation of a water level constructed in accordance with the invention. Fig. 2 is an end elevation of Fig. 1 with the water tube removed.

Corresponding and like parts are referred to in the following description and indicated in all the views of the drawing by the same reference characters.

Referring to the drawing, the numeral 1 designates the water tube which may be of any desired length and may be formed of any suitable material such as rubber. The two extremities of this water tube 1 are slipped over the reduced lower ends of glass gage tubes 2 which are shown as provided with the graduations 3. The upper end of each of the gage tubes 2 is engaged by means of a sleeve 4 which is pendent from a frame 7 carried by a level plate 9. The frame 7 is substantially rectangular in shape and a spirit level 8 is mounted between the opposite ends thereof. The sleeve 4 projects downwardly from the central portion of the lower side of the frame 7 and the top of the gage tube 2 is always open so as to prevent any accumulation of air above the level of the water such as would cause the instrument to give a false reading. Some liquid such as water, alcohol, or the like, would be placed in the tube 1, and the level plates 9 applied to different points upon the ceiling. The level of the liquid within the transparent gage tubes 2 would be clearly visible and the graduations 3 would enable the operator to accurately determine the difference in elevation between the two parts of the ceiling to which the plates 9 had been applied.

At suitable points in the length of the water tube 1 air valves 14 will be provided, and in the present instance these air valves are shown as formed in connection with tubular sections 16 which fit within the water tube. These air valves enable air which may accumulate within the water tube to be quickly released, and the water level can thereby be kept in accurate adjustment so as to give true and correct readings.

When the level is not in use, the various parts thereof can be disconnected from each other so as to admit of the level being packed in a very small amount of space.

The frames in which the bubble tubes are mounted may be employed as ordinary spirit levels if desirable.

The graduations 3 upon the gage tubes 2 enable differences in the elevation of the two parts of the ceiling to which the gage is applied to be accurately determined, so that any necessary correction can be intelligently made.

It will thus be obvious that I have provided a water level in which air can be readily prevented from accumulating in the water tube, and which can be easily and quickly applied to a ceiling or the like for the purpose of determining the difference between the levels of any two portions thereof.

Having thus described the invention, what

I claim as new and desire to secure by Letters Patent, is:—

1. In a water level, the combination of a flexible water tube, gage tubes applied to the ends of the water tube, a frame applied to the open end of each of the gage tubes, and a level plate carried by the frame.

2. In a water level, the combination of a flexible water tube, gage tubes applied to the ends of the water tube, level plates constructed with spirit level frames provided with sleeves for engaging the gage tubes, and a spirit level mounted upon each said spirit level frame.

3. In a water level, the combination of a flexible water tube, gage tubes applied to the ends of the water tube, an air valve applied to the water tube, level plates, and means for connecting the level plates and the gage tubes.

4. In a water level, the combination of a flexible water tube, tubular members arranged in the water tube and provided with air valves, gage tubes applied to the ends of the water tube, level plates, and means for connecting the level plates to the gage tubes.

5. In a water level, the combination of a flexible water tube, glass gage tubes applied to the ends of the water tube, level plates, substantially rectangular spirit level frames carried by the level plates, spirit levels mounted within the spirit level frames, and sleeves projecting from the sides of the spirit level frames, the said sleeves engaging the open ends of the gage tubes.

In testimony whereof I affix my signature in presence of two witnesses.

HERBERT S. WEYMOUTH.

Witnesses:
ABRAHAM ZINDELL,
JERE E. LAMBERTSON.

---

Copies of this patent may be obtained for five cents each, by addressing the "Commissioner of Patents, Washington, D. C."